US011163633B2

(12) United States Patent
Bangad et al.

(10) Patent No.: US 11,163,633 B2
(45) Date of Patent: Nov. 2, 2021

(54) APPLICATION FAULT DETECTION AND FORECASTING

(71) Applicant: BANK OF AMERICA CORPORATION, Charlotte, NC (US)

(72) Inventors: Sunil R. Bangad, Kendall Park, NJ (US); Praveen Kumar Kasu, Chennai (IN); Akashkumar V. Desai, Lawrenceville, NJ (US)

(73) Assignee: Bank of America Corporation, Charlotte, NC (US)

( * ) Notice: Subject to any disclaimer, the term of this patent is extended or adjusted under 35 U.S.C. 154(b) by 170 days.

(21) Appl. No.: 16/393,701

(22) Filed: Apr. 24, 2019

(65) Prior Publication Data
US 2020/0341830 A1   Oct. 29, 2020

(51) Int. Cl.
*G06F 11/07*   (2006.01)
*G06F 11/36*   (2006.01)
*G06N 20/00*   (2019.01)

(52) U.S. Cl.
CPC ........ *G06F 11/079* (2013.01); *G06F 11/0754* (2013.01); *G06F 11/0772* (2013.01); *G06F 11/3616* (2013.01); *G06N 20/00* (2019.01)

(58) Field of Classification Search
CPC .............. G06F 11/0754; G06F 11/076; G06F 11/0703; G06F 11/0751; G06F 11/0772; G06F 11/3466; G06F 11/3604; G06F 11/3612; G06F 11/3616; G06N 20/00
See application file for complete search history.

(56) References Cited

U.S. PATENT DOCUMENTS

| 6,591,255 | B1 | 7/2003 | Tatum et al. |
| 6,760,903 | B1 | 7/2004 | Morshed et al. |
| 7,062,540 | B2 | 6/2006 | Reddy et al. |
| 7,069,559 | B2 | 6/2006 | Janssen et al. |
| 7,379,999 | B1 | 5/2008 | Zhou et al. |
| 7,386,807 | B2 | 6/2008 | Cummins et al. |
| 7,600,146 | B2 | 10/2009 | Liccione et al. |
| 7,689,558 | B2 | 3/2010 | Rossmann |
| 7,814,198 | B2 | 10/2010 | Christensen et al. |
| 7,861,120 | B2 | 12/2010 | Cui |

(Continued)

FOREIGN PATENT DOCUMENTS

WO    WO-2019213086 A1 * 11/2019 .............. G06F 11/30

*Primary Examiner* — Bryce P Bonzo
*Assistant Examiner* — Albert Li
(74) *Attorney, Agent, or Firm* — Michael A. Springs

(57) ABSTRACT

An application monitoring device that includes a memory operable to store an application and a fault detection engine implemented by a processor. The fault detection engine is configured to obtain a set of application metric values for the application. Each application metric value indicates a performance level of the application. The fault detection engine is further configured to compare each application metric value to a set of application metric value ranges and to determine a performance status value for each application metric value based on the comparison. The fault detection engine is further configured to determine a warning level for the application and to determine that the warning level exceeds the fault detection threshold value. The fault detection engine is further configured to trigger an alert indicating a fault has been detected in the application in response to the determination.

17 Claims, 5 Drawing Sheets

(56) References Cited

U.S. PATENT DOCUMENTS

| | | |
|---|---|---|
| 7,900,201 B1 | 3/2011 | Qureshi et al. |
| 8,180,716 B2 | 5/2012 | Kshirsagar et al. |
| 8,527,986 B1 | 9/2013 | Mojica et al. |
| 8,578,342 B2 | 11/2013 | Artzi et al. |
| 8,589,947 B2 | 11/2013 | Potter et al. |
| 8,856,312 B2 | 10/2014 | MacLellan et al. |
| 8,943,478 B2 | 1/2015 | Artzi et al. |
| 9,084,937 B2 | 7/2015 | Gadher et al. |
| 9,167,028 B1 | 10/2015 | Bansal et al. |
| 9,189,364 B2 | 11/2015 | Crosby |
| 9,219,639 B2 | 12/2015 | Jain et al. |
| 9,298,525 B2 | 3/2016 | Zhu et al. |
| 9,306,812 B2 | 4/2016 | Srivastava et al. |
| 9,367,424 B2 | 6/2016 | Boehm et al. |
| 9,495,348 B2 | 11/2016 | Bastide et al. |
| 9,547,834 B2 | 1/2017 | Nayyar et al. |
| 9,672,085 B2 | 6/2017 | Zhu et al. |
| 9,716,613 B2 | 7/2017 | Jain et al. |
| 9,734,674 B1 * | 8/2017 | Rabe .................. G08B 3/00 |
| 9,760,874 B2 | 9/2017 | Zaidi et al. |
| 9,965,758 B2 | 5/2018 | Zaidi et al. |
| 9,983,871 B1 * | 5/2018 | Edwards .............. H04L 67/34 |
| 9,992,090 B2 | 6/2018 | Nayyar et al. |
| 10,026,045 B1 * | 7/2018 | Portnoy ............. G06Q 10/0639 |
| 10,049,403 B2 | 8/2018 | Zaidi et al. |
| 10,084,722 B2 | 9/2018 | Iyer et al. |
| 10,102,056 B1 * | 10/2018 | Goldberg ............ G06F 11/0787 |
| 2004/0215768 A1 | 10/2004 | Oulu et al. |
| 2005/0038832 A1 | 2/2005 | Feigenbaum |
| 2005/0065753 A1 * | 3/2005 | Bigus .................. G06N 5/048 |
| | | 702/186 |
| 2006/0218267 A1 | 9/2006 | Khan et al. |
| 2007/0244937 A1 | 10/2007 | Flynn, Jr. et al. |
| 2009/0113052 A1 | 4/2009 | Doshi et al. |
| 2010/0281155 A1 | 11/2010 | Cipollone et al. |
| 2011/0083186 A1 | 4/2011 | Niemela et al. |
| 2012/0197626 A1 | 8/2012 | Kejariwal et al. |
| 2012/0221898 A1 * | 8/2012 | Suit ................... G06F 11/079 |
| | | 714/37 |
| 2013/0024179 A1 | 1/2013 | Mazzaro et al. |
| 2013/0151692 A1 * | 6/2013 | White ................ H04L 41/145 |
| | | 709/224 |
| 2013/0179865 A1 | 7/2013 | Neumeyer et al. |
| 2013/0227353 A1 | 8/2013 | Dash et al. |
| 2015/0133076 A1 | 5/2015 | Brough |
| 2015/0261624 A1 | 9/2015 | Locasto et al. |
| 2016/0314034 A1 | 10/2016 | Adinarayan et al. |
| 2016/0321591 A1 | 11/2016 | Bivens et al. |
| 2017/0046244 A1 | 2/2017 | Vlachogiannis et al. |
| 2017/0116014 A1 | 4/2017 | Yang et al. |
| 2017/0242773 A1 * | 8/2017 | Cirne .................. G06F 11/079 |
| 2017/0364402 A1 * | 12/2017 | Chua ................. G06F 11/0751 |
| 2017/0371932 A1 * | 12/2017 | Chamarajnagar ........ G06F 7/20 |
| 2018/0113773 A1 * | 4/2018 | Krishnan ............ G06F 11/008 |
| 2020/0233791 A1 * | 7/2020 | Manzano ........... G06F 11/3664 |
| 2020/0336500 A1 * | 10/2020 | Urmanov ........... H04L 63/1425 |
| 2020/0348363 A1 * | 11/2020 | Kvam ................. G01R 31/343 |

* cited by examiner

APPLICATION FAULT DETECTION AND FORECASTING

TECHNICAL FIELD

The present disclosure relates generally to application fault detection, and more specifically to monitoring, detecting, and forecasting application faults.

BACKGROUND

In some systems, applications may communicate with or depend on several other applications to perform operations or to provide services. For example, a web service application may communicate a network of other applications to provide a service. Detecting application faults poses a technical challenge because a fault may occur in any of the applications that are downstream from an originating application which makes isolating faults difficult. Application faults may negatively impact other applications that are upstream or otherwise dependent on faulty applications. For example, the performance of an originating application may be degraded due to one or more downstream applications. Detecting application faults is also technically challenging because many instances of an application are unique which means that a universal set of rules cannot be applied to detect faults. For example, the performance level of an application depends on the hardware of the device executing the application which may vary from device to device. Application faults can degrade the performance of a device as well as the performance of other devices in the system. For example, application faults may cause applications to run slowly and hardware resources are consumed for longer periods of times. This means that hardware resources are unavailable to perform other operations which limits the throughput of a device and other upstream devices.

Thus, it is desirable to provide a technical solution that provides the ability to detect application faults.

SUMMARY

In some systems, applications may communicate with or depend on several other applications to perform operations or to provide services. For example, a web service application may communicate a network of other applications to provide a service. Detecting application faults poses a technical challenge because a fault may occur in any of the applications that are downstream from an originating application which makes isolating faults difficult. Application faults may negatively impact other applications that are upstream or otherwise dependent on faulty applications. For example, the performance of an originating application may be degraded due to one or more downstream applications. Detecting application faults is also technically challenging because many instances of an application are unique which means that a universal set of rules cannot be applied to detect faults. For example, the performance level of an application depends on the hardware of the device executing the application which may vary from device to device. Application faults can degrade the performance of a device as well as the performance of other devices in the system. For example, application faults may cause applications to run slowly and hardware resources are consumed for longer periods of times. This means that hardware resources are unavailable to perform other operations which limits the throughput of a device and other upstream devices.

The system described in the present application provides a technical solution to the technical problems discussed above by employing an application fault detection architecture. The disclosed system provides several advantages which include the ability to isolate and detect application faults based on the individual performance of an application. This approach is in contrast to other approaches that rely on a generic set of rules for detecting faults. In addition, the disclosed system also provides the ability to forecast the performance of an application and predict future application faults.

The fault detection system is configured to monitor performance metrics for an application to detect performance degradations and faults related to the application. For example, the fault detection system may be configured to periodically obtain or measure a set of application performance metrics and to determine a performance status for each of the application performance metrics. A performance status is a value that indicates how the current performance metric of application compares to its previous performance history. The fault detection system then compares the number of performance statuses that indicate a performance degradation to a fault detection threshold value. The fault detection system is further configured to send an alert when the number of performance statuses that indicate a performance degradation is greater than or equal to the fault detection threshold value which means a fault has been detected. The alert can be used to signal a user or a device about the presence of a fault in the application. This process allows the fault detection system to detect application faults based on the current behavior of the application compared to its previous behavior.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The system described in the present application provides a technical solution to the technical problems discussed above by employing an application fault detection architecture. The disclosed system provides several advantages which include the ability to isolate and detect application faults based on the individual performance of an application. This approach is in contrast to other approaches that rely on a generic set of rules for detecting faults. In addition, the disclosed system also provides the ability to forecast the performance of an application and predict future application faults.

Figure 1:
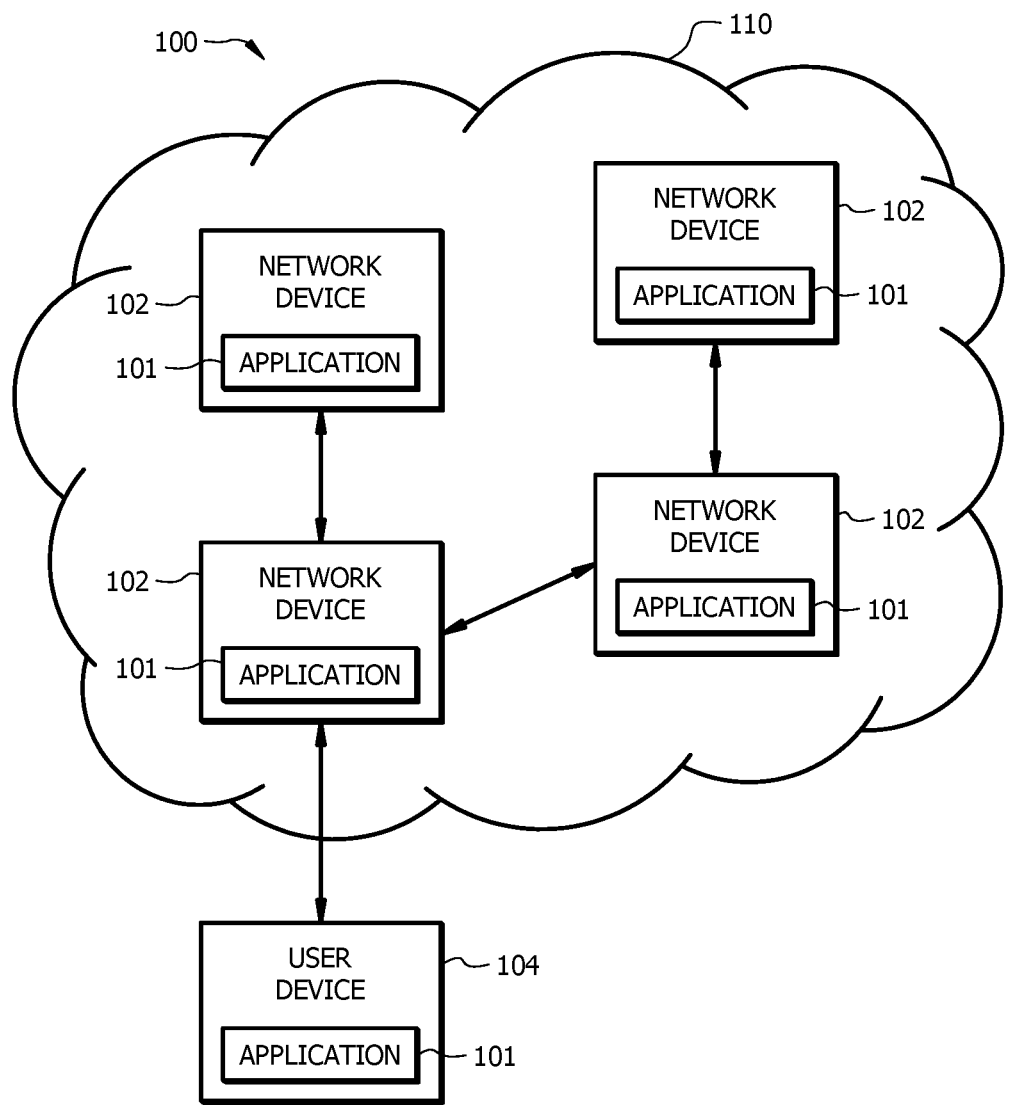
FIG. 1 is a schematic diagram of an embodiment of a system configured to implement an application fault detection architecture.
Figure 2:
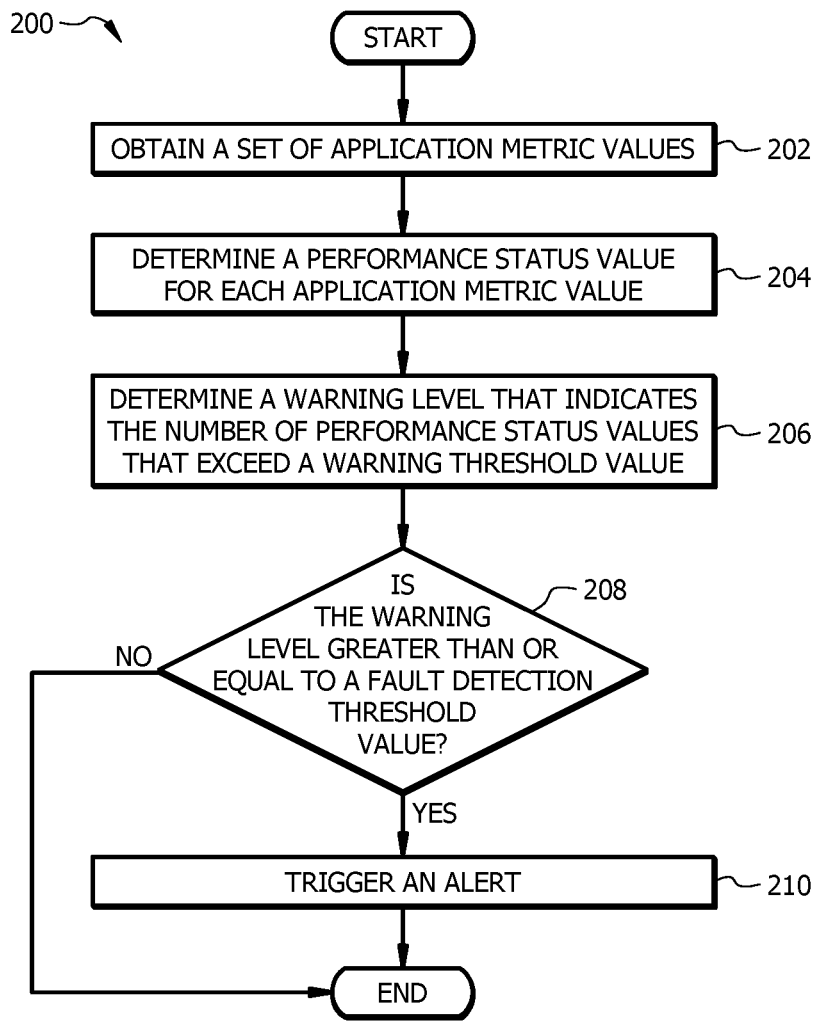
FIG. 2 is an embodiment of a flowchart of an application fault detection method.
Figure 3:
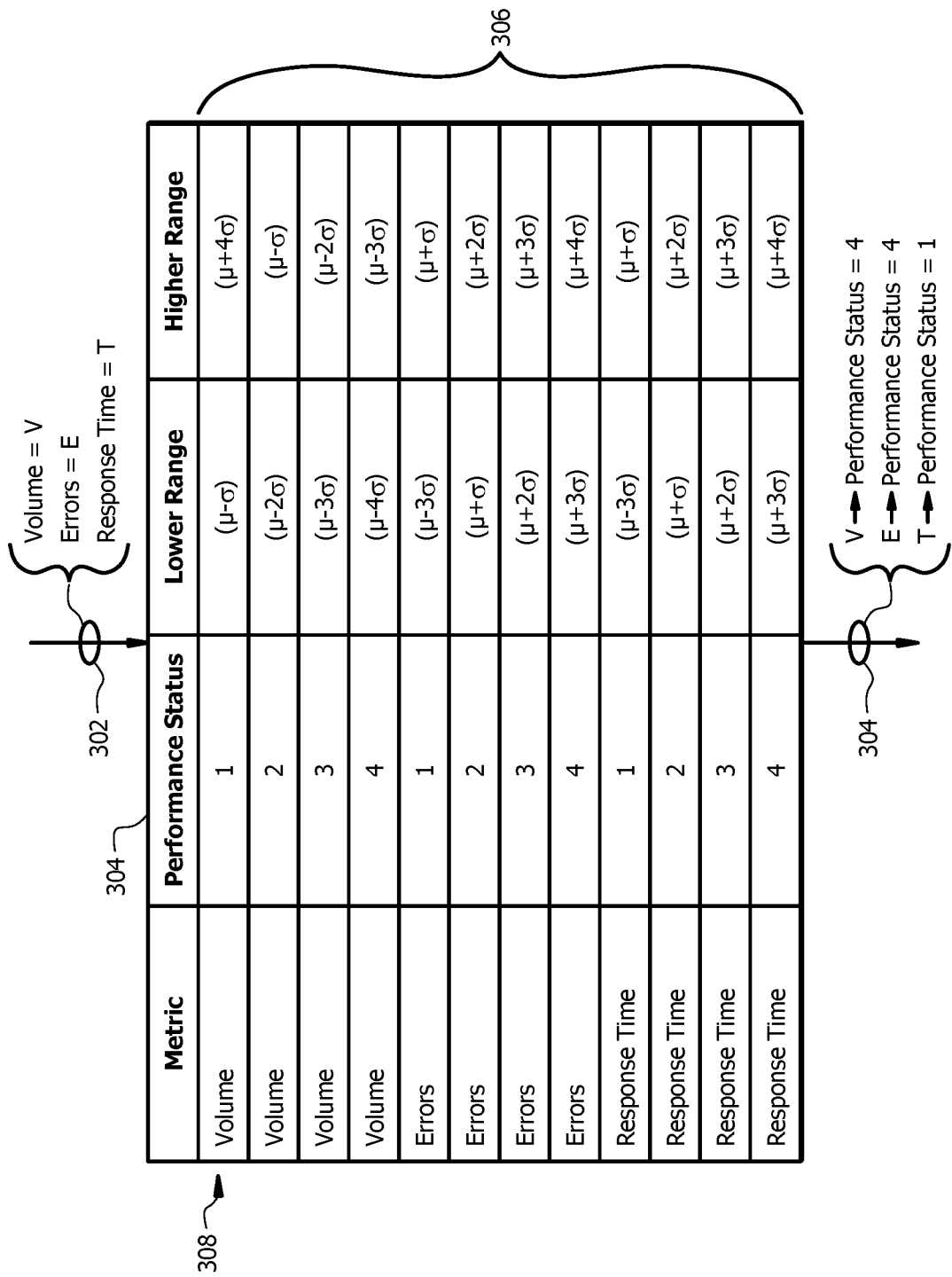
FIG. 3 is an illustrated example of a portion of the application fault detection method.
Figure 4:
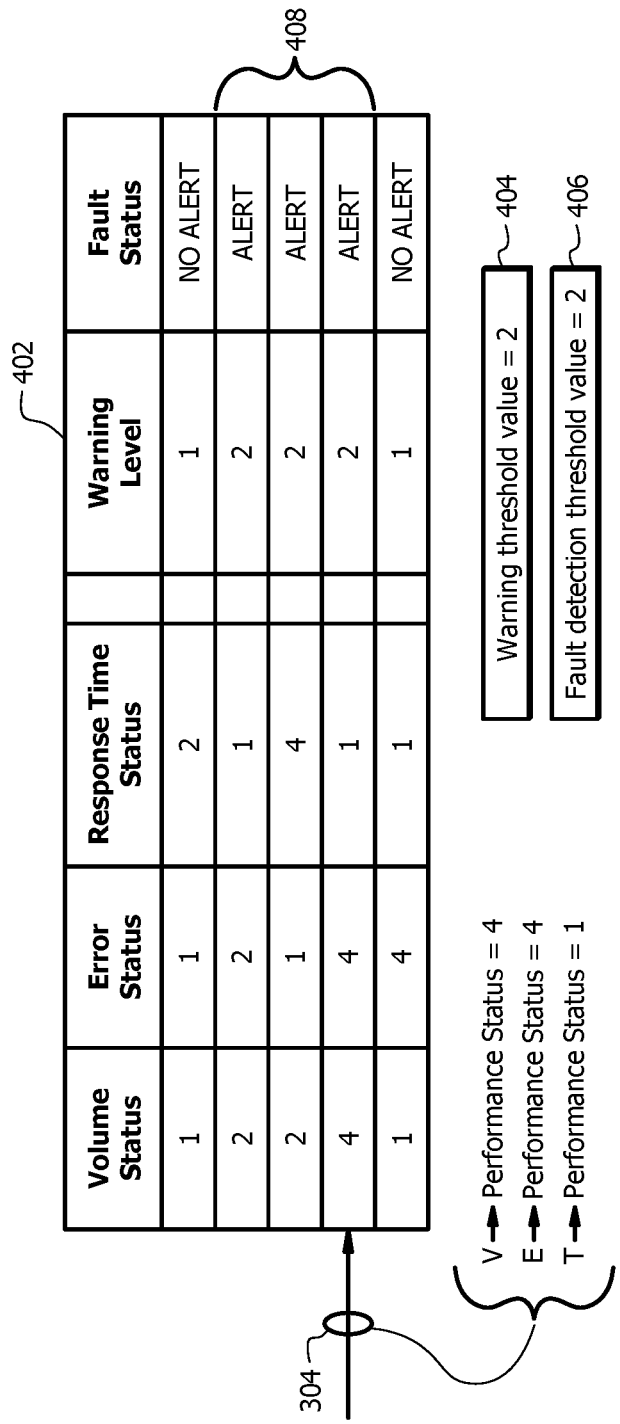
FIG. 4 is an illustrated example of another portion of the application fault detection method.
Figure 5:
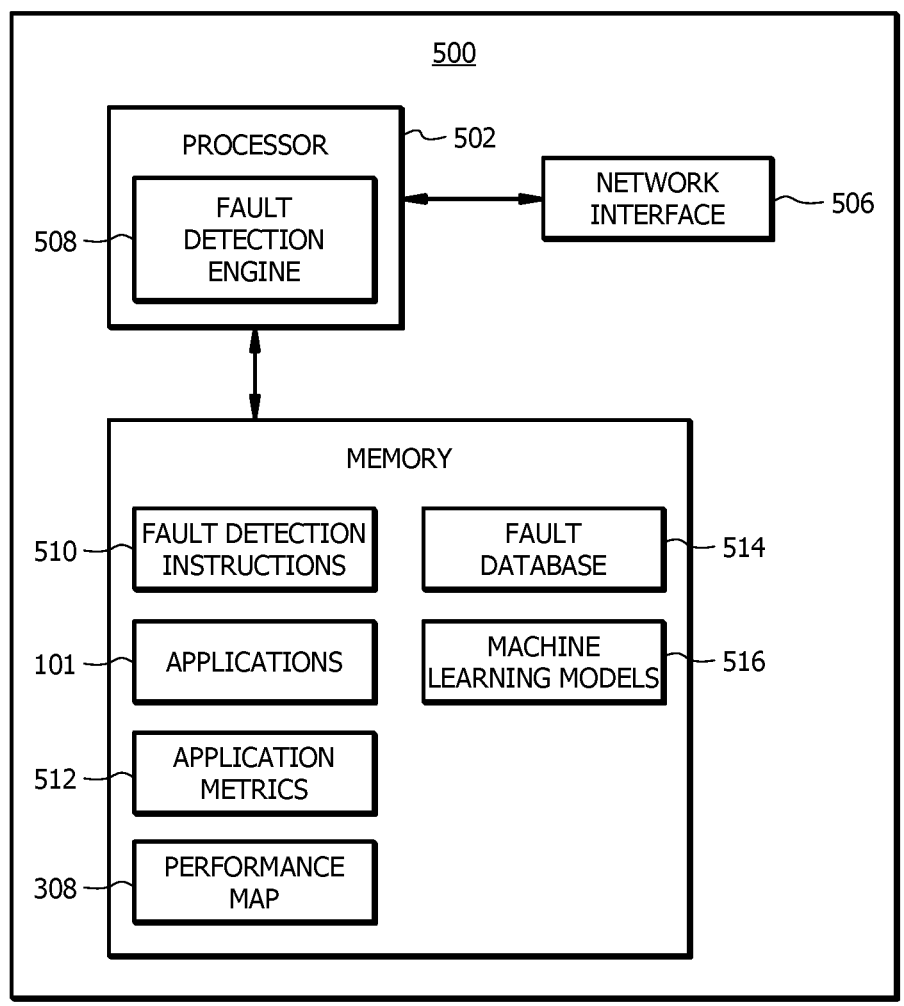
FIG. 5 is an embodiment of a device configured to implement an application fault detection architecture.

FIG. 1 is an example of a system configured to implement an application fault detection architecture. FIGS. 2-4 combine to provide an example of a process for detecting application faults. FIG. 5 is an example of a device configured to implement the application fault detection architecture.

FIG. 1 is a schematic diagram of an embodiment of a fault detection system 100 configured to implement an application fault detection architecture. The fault detection system 100 provides an architecture that can be used to detect faults and performance degradation in applications 101. The fault detection system 100 is configured to monitor performance metrics for an application 101 to detect performance degradations and faults related to the application 101. For example, the fault detection system 100 may be configured to periodically obtain (e.g. measure) a set of application performance metrics and to determine a performance status for each of the application performance metrics. A performance status is a value that indicates how the current performance metric of application 101 compares to its previous performance history. The fault detection system 100 then compares the number of performance statuses that indicate a performance degradation to a fault detection threshold value. The fault detection system 100 is further configured to send an alert when the number of performance statuses that indicate a performance degradation is greater than or equal to the fault detection threshold value which means that a fault was detected. The alert can be used to signal a user or a device about the presence of a fault in the application 101. This process allows the fault detection system 100 to detect application faults based on the current behavior of the application 101 compared to its previous behavior. Additional details about the application fault detection process is described in FIG. 2.

In one embodiment, the fault detection system 100 comprises one or more network devices 102 in signal communication with each other in a network 110. Examples of a network device 102 include, but are not limited to, computers, databases, web servers, or any other suitable type of network device. Each network device 102 may be comprise one or more applications 101. Examples of applications 101 include, but are not limited to, web services, web applications, local applications, or any other suitable type of application. One or more of the network devices 102 may be in signal communication with other devices (e.g. user devices 104). For example, a network device 102 may be configured to provide user devices 104 with access to applications 101 or web services. Examples of user devices 104 include, but are not limited to, computers, mobile devices (e.g. smart phones or tablets), Internet-of-things (IoT) devices, web clients, web servers, or any other suitable type of device. User devices 104 may comprise one or more applications 101.

The network 110 is any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art upon viewing this disclosure.

Application Fault Detection Process

FIG. 2 is an embodiment of a flowchart of an application fault detection method 200. A device (e.g. network device 102 or user device 104) may use a fault detection engine 508 to employ method 200 to monitor one or more of its applications 101 for application faults. Additional details about the device and the fault detection engine 508 are described in FIG. 5.

At step 202, the fault detection engine 508 obtains a set of application metric values 302. Each application metric value is associated with a performance metric for the application 101 and indicates a current performance level of the application 101. Examples of application metrics include, but are not limited to, a volume of application log files, an output volume metric, a number of errors metric, and a response time metric. Referring to FIG. 3 as an example, a set of application metric values 302 may comprise an average output volume for the application 101, an average number of errors for the application 101, and an average response time for the application 101. In other examples, the set of application metric values 302 may comprise any other suitable type and/or number of application metric values. In one embodiment, the fault detection engine 508 obtains the set of application metric values 302 by periodically measuring the application metric values 302 at predetermined time intervals. For example, the fault detection engine 508 may be configured to measure the set of application metrics 302 every thirty seconds, one minute, five minutes, or after any other suitable amount of time. The fault detection engine 508 may employ any suitable technique for measuring the set of performance metrics.

Returning to FIG. 2 at step 204, the fault detection engine 508 determines a performance status value 304 for each application metric value 302. Here, the fault detection engine 508 compares each application metric value 302 to a set of application metric value ranges 306 to determine a performance status value 304. Each application metric value range 306 is linked with a different performance status value 304. In one embodiment, the performance status value 304 correlates with a level of performances degradation. In other words, a high performance status value 304 corresponds with a large amount of performance degradation. A low performance status value 304 corresponds with a smaller amount of performance degradation. In some examples, the performance status values 304 may also be linked with other identifiers such as colors or symbols. For example, a performance status value 304 linked with the color green may indicate a healthy performance level while a performance status value 304 linked with the color red may indicate a poor performance level.

Referring to FIG. 3, the fault detection engine 508 may compare the output volume metric value 302 for output volume to a set of application metric value ranges 306 in a performance map 308. In one embodiment, the set of application metric value ranges 306 are determined based on the previous operation of the application 101 over time and are uniquely associated with the application 101. In one example, each application metric value range 306 may identify values within a predetermined number of standard deviations, $\sigma$, away from an average application metric value, $\mu$, over time. In this example, for the output volume application metric, the performance map 308 links an application metric value range 306 between $(\mu-\sigma)$ and $(\mu+4\sigma)$ with a performance status value 304 of one, an application metric value range 306 between $(\mu-2\sigma)$ and $(\mu-\sigma)$ with a performance status value 304 of two, an application metric value range 306 between $(\mu-3\sigma)$ and $(\mu-2\sigma)$ with a performance status value 304 of three, and an application metric value range 306 between (μ−4σ) and (μ−3σ) with a performance status value 304 of four. The fault detection engine 508 compares the application metric value 302 for output volume to the application metric value ranges 306 to identify a corresponding performance status value 304. The fault detection engine 508 repeats this process for each of the application metric values 302. In FIG. 3, the fault detection engine 508 determines the application metric value 302 for output volume corresponds with a performance status value 304 of four, the application metric value 302 for errors corresponds with a performance status value 304 of four, and the application metric value 302 for response time corresponds with a performance status value 304 of one.

Returning to FIG. 2 at step 206, the fault detection engine 508 determines a warning level 402 for the application 101. The warning level 402 indicates the number of performance status values 304 that exceed a warning threshold value 404. Referring to FIG. 4 as an example, the fault detection engine 508 compares each of the performance statuses 304 to a warning threshold value 404 of two. In this example, the fault detection engine 508 determines that the warning level 402 is two because two of the performance statuses 304 exceed the warning threshold value 404. In other examples, the warning threshold value 404 may be set to any other suitable value.

Returning to FIG. 2 at step 208, the fault detection engine 508 determines whether the warning level 402 is greater than or equal to a fault detection threshold value 406. Here, the fault detection engine 508 determines whether a fault is present by comparing the warning level 402 for the application 101 to a predetermined fault detection threshold value 406. Referring again to FIG. 4, the fault detection engine 508 compares the warning level 402 to a fault detection threshold value 406 of two. In this example, the fault detection engine determines that the warning level 402, which has a value of two, is equal to the fault detection threshold value 406 which indicates that a fault has been detected and triggers an alert 408. In other examples, the fault detection threshold value 406 may be set to any other suitable value.

Returning to FIG. 2, the fault detection engine 508 proceeds to step 210 in response to determining that the warning level 402 is greater than or equal to the fault detection threshold value 406. Otherwise, the fault detection engine 508 terminates method 200. In some embodiments, the fault detection engine 508 may return to step 202 in response to determining that the warning level 402 is less than the fault detection threshold value 406. For example, the fault detection engine 508 may return to step 202 to repeat method 200 to continue monitoring for application faults.

At step 210, the fault detection engine 508 triggers an alert 408 in response to determining that the warning level 402 is greater than or equal to the fault detection threshold value 406. Examples of an alert 408 include, but are not limited to, an application pop-up, an email, or any other suitable type of alert. In one embodiment, the alert 408 identifies a fault type for the detected application fault. Examples of fault types include, but are not limited to, series 400 client errors, series erver errors, error handling errors, boundary related errors, control flow errors, hardware errors, calculation errors, race condition errors, load condition errors, or any other suitable type of error. In other examples, the alert may comprise any other suitable type of information. In one embodiment, the fault detection engine 508 is configured to suspend the execution of the application 101 in response to triggering an alert 408 for the application 101.

Here, the fault detection engine 508 may terminate or reset the application 101 to mitigate any negative impact on other applications 101 in the network 110.

In one embodiment, the fault detection engine 508 is further configured to monitor and determine the application metrics that caused a faulty state for an application. For example, the fault detection engine 508 may be configured to record application metric values 302, the application fault type, a timestamp associated with when an application fault occurred, and/or any other suitable information in a fault database 514. The fault detection engine 508 may be configured to use information from the fault database 514 to train a machine learning model 516 to forecast future application faults. The machine learning model 516 may be configured to forecast future application faults using a time series forecasting algorithm, Kalman filtering, or any other suitable technique as would be appreciated by one of ordinary skill in the art. The machine learning model 516 may be implemented using any suitable type of neural network model and may comprise any suitable number of neurons and/or layers (e.g. hidden layers). In one embodiment, the fault detection engine 508 may use results from the machine learning model 516 to determine and update values for the set of application metric value ranges 306 in the performance map 308.

Application Fault Detection Device

FIG. 5 is an embodiment of a device 500 (e.g. network device 102 or user device 104) configured to implement an application fault detection architecture. The device 500 comprises a processor 502, a memory 504, and a network interface 506. The device 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the fault detection engine 508. In this way, processor 502 may be a special purpose computer designed to implement function disclosed herein. In an embodiment, the fault detection engine 508 is implemented using logic units, FPGAs, ASICs, DSPs, or any other suitable hardware. The fault detection engine 508 is configured as described in FIGS. 2-4.

The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM).

The memory 504 is operable to store fault detection instructions 510, applications 106, application metrics 512, performance maps 308, a fault database 514, machine learning models 516, and/or any other data or instructions. The fault detection instructions 510 may comprise any suitable set of instructions, logic, rules, or code operable to execute the fault detection engine 508. The applications 106 are configured similar to the applications 106 described in FIG. 1. The application metrics 512 are configured similar to the application metrics described in FIGS. 2-4. Performance maps 308 may be configured similar to the performance maps 308 described in FIG. 3.

The network interface 506 is configured to enable wired and/or wireless communications. The network interface 506 is configured to communicate data between the device 500 and other devices (e.g. network devices 102 or user devices 104), systems, or domain. For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An application monitoring device, comprising:
a memory operable to store an application; and
a fault detection engine implemented by a processor operably coupled to the memory, configured to:
obtain a plurality of application metric values for the application, wherein each application metric value indicates a performance level of the application;
compare each application metric value to a set of application metric value ranges, wherein each application metric value range corresponds with a different performance status value;
determine a performance status value for each application metric value based on the comparison;
compare the performance status value for each application metric value to a warning threshold value, wherein the warning threshold value is compared to the performance status value for each application metric value;
determine a warning level for the application, wherein the warning level is equal to a number of performance status values that exceed the warning threshold value;
compare the warning level to a fault detection threshold value, wherein the fault detection threshold value is an integer value that is greater than or equal to two;
determine that the warning level exceeds the fault detection threshold value;
trigger an alert indicating a fault has been detected in the application in response to the determination, wherein triggering the alert suspends the execution of the application;
record information associated with the fault, wherein the information associated with the fault comprises the plurality of application metric values for the application; and
train a machine learning model using the recorded information associated with the fault, wherein the machine learning model is configured to output updated values for the set of application metric value ranges.

2. The device of claim 1, wherein the plurality of application metric values comprises:
an output volume for the application;
a number of errors for the application; and
a response time for the application.

3. The device of claim 1, wherein obtaining the plurality of application metric values comprises measuring the plurality of application metric values at predetermined time intervals.

4. The device of claim 1, wherein each application metric value range identifies values within a predetermined number of standard deviations away from an average application metric value over time.

5. The device of claim 1, wherein:
the set of application metric value ranges are based on the previous operation of the application over time; and
the set of application metric value ranges are uniquely associated with the application.

6. The device of claim 1, wherein the alert identifies a fault type for the fault in the application.

7. An application fault detection method, comprising:
obtaining a plurality of application metric values for an application, wherein each application metric value indicates a performance level of the application;
comparing each application metric value to a set of application metric value ranges, wherein each application metric value range corresponds with a different performance status value;
determining a performance status value for each application metric value based on the comparison;

comparing the performance status value for each application metric value to a warning threshold value, wherein the warning threshold value is compared to the performance status value for each application metric value;

determining a warning level for the application, wherein the warning level is equal to a number of performance status values that exceed the warning threshold value;

comparing the warning level to a fault detection threshold value, wherein the fault detection threshold value is an integer value that is greater than or equal to two;

determining that the warning level exceeds the fault detection threshold value;

triggering an alert indicating a fault has been detected in the application in response to the determination, wherein triggering the alert suspends the execution of the application;

recording information associated with the fault, wherein the information associated with the fault comprises the plurality of application metric values for the application; and training a machine learning model using the recorded information associated with the fault, wherein the machine learning model is configured to output updated values for the set of application metric value ranges.

8. The method of claim 7, wherein the plurality of application metric values comprises:
an output volume for the application;
a number of errors for the application; and
a response time for the application.

9. The method of claim 7, wherein obtaining the plurality of application metric values comprises measuring the plurality of application metric values at predetermined time intervals.

10. The method of claim 7, wherein each application metric value range identifies values within a predetermined number of standard deviations away from an average application metric value over time.

11. The method of claim 7, wherein:
the set of application metric value ranges are based on the previous operation of the application over time; and
the set of application metric value ranges are uniquely associated with the application.

12. The method of claim 7, wherein the alert identifies a fault type for the fault in the application.

13. A computer program product comprising a non-transitory computer readable medium storing executable instructions that when executed by a processor causes the processor to:
obtain a plurality of application metric values for an application, wherein each application metric value indicates a performance level of the application;

compare each application metric value to a set of application metric value ranges, wherein each application metric value range corresponds with a different performance status value;

determine a performance status value for each application metric value based on the comparison;

compare the performance status value for each application metric value to a warning threshold value, wherein the warning threshold value is compared to the performance status value for each application metric value;

determine a warning level for the application, wherein the warning level is equal to a number of performance status values that exceed the warning threshold value;

compare the warning level to a fault detection threshold value, wherein the fault detection threshold value is an integer value that is greater than or equal to two;

determine that the warning level exceeds the fault detection threshold value; and trigger an alert indicating a fault has been detected in the application in response to the determination, wherein triggering the alert suspends the execution of the application;

record information associated with the fault, wherein the information associated with the fault comprises the plurality of application metric values for the application, wherein the information associated with the fault comprises the plurality of application metric values for the application; and train a machine learning model using the recorded information associated with the fault, wherein the machine learning model is configured to output updated values for the set of application metric value ranges.

14. The computer program product of claim 13, wherein the plurality of application metric values comprises:
an output volume for the application;
a number of errors for the application; and
a response time for the application.

15. The computer program product of claim 13, wherein obtaining the plurality of application metric values comprises measuring the plurality of application metric values at predetermined time intervals.

16. The computer program product of claim 13, wherein each application metric value range identifies values within a predetermined number of standard deviations away from an average application metric value over time.

17. The computer program product of claim 13, wherein:
the set of application metric value ranges are based on the previous operation of the application over time; and
the set of application metric value ranges are uniquely associated with the application.

* * * * *